United States Patent
Nagae et al.

(10) Patent No.: US 10,717,438 B2
(45) Date of Patent: Jul. 21, 2020

(54) LANE KEEP ASSIST DEVICE

(71) Applicant: TOYOTA JIDOSHA KABUSHIKI KAISHA, Toyota-shi, Aichi-ken (JP)

(72) Inventors: Akira Nagae, Susono (JP); Ryo Inomata, Kanagawa-ken (JP); Hironori Ito, Susono (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 85 days.

(21) Appl. No.: 15/718,769

(22) Filed: Sep. 28, 2017

(65) Prior Publication Data

US 2018/0105170 A1 Apr. 19, 2018

(30) Foreign Application Priority Data

Oct. 13, 2016 (JP) .................................. 2016-201913

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2019.01) | |
| *B60W 30/12* | (2020.01) | |
| *G06K 9/00* | (2006.01) | |
| *G08G 1/16* | (2006.01) | |

(52) U.S. Cl.
CPC ......... *B60W 30/12* (2013.01); *G06K 9/00798* (2013.01); *G06K 9/00805* (2013.01); *G08G 1/166* (2013.01); *G08G 1/167* (2013.01)

(58) Field of Classification Search
CPC .............. B60W 30/12; G06K 9/00798; G06K 9/00805; G08G 1/166; G08G 1/167
See application file for complete search history.

(56) References Cited

U.S. PATENT DOCUMENTS

| | | | | |
|---|---|---|---|---|
| 2011/0022317 | A1* | 1/2011 | Okita | .................... B60W 30/12 |
| | | | | 701/301 |
| 2011/0234390 | A1 | 9/2011 | Danner et al. | |
| 2012/0265431 | A1* | 10/2012 | Hayakawa | ................ B60T 7/22 |
| | | | | 701/301 |

(Continued)

FOREIGN PATENT DOCUMENTS

| | | |
|---|---|---|
| JP | 2005-324782 A | 11/2005 |
| JP | 2010-18207 A | 1/2010 |

(Continued)

*Primary Examiner* — Harry Y Oh
(74) *Attorney, Agent, or Firm* — Sughrue Mion, PLLC (57) ABSTRACT

A lane keep assist device is configured to perform lane keep assist control for making a host vehicle travel along a lane, and preventing the host vehicle from departing from the lane. The lane keep assist device includes an electronic control device configured to detect presence or absence of another vehicle, present in a vicinity of the host vehicle, which have a gradual decrease in a distance from the host vehicle, and when the other vehicle is detected, the electronic control device configured to set virtual line extending along front-rear direction of the detected other vehicle at position away by first predetermined distance in right-left direction of the other vehicle from lateral side of the detected other vehicle, and to specify the lane based on the set virtual line to perform the lane keep assist control.

6 Claims, 5 Drawing Sheets (56) References Cited

U.S. PATENT DOCUMENTS

| | | | |
|---|---|---|---|
| 2015/0269445 A1* | 9/2015 | Ueda | G06K 9/00798 |
| | | | 348/118 |
| 2016/0200317 A1* | 7/2016 | Danzl | B60K 28/06 |
| | | | 701/25 |
| 2016/0250964 A1* | 9/2016 | Takagaki | B60Q 1/08 |
| | | | 362/466 |
| 2017/0269602 A1* | 9/2017 | Nakamura | B60W 30/09 |
| 2018/0197414 A1* | 7/2018 | Oooka | G08G 1/167 |

FOREIGN PATENT DOCUMENTS

| | | |
|---|---|---|
| JP | 2010-92416 A | 4/2010 |
| JP | 2011-134071 A | 7/2011 |
| JP | 5350397 B2 | 8/2013 |
| WO | 2016/031011 A1 | 3/2016 |

* cited by examiner

LANE KEEP ASSIST DEVICE

INCORPORATION BY REFERENCE

The disclosure of Japanese Patent Application No. 2016-201913 filed on Oct. 13, 2016 including the specification, drawings and abstract is incorporated herein by reference in its entirety.

BACKGROUND

1. Technical Field

The disclosure relates to a lane keep assist device.

2. Description of Related Art

As a lane keep assist device, for example, a device is proposed in which a determination is made whether departure from a lane by passing over a lane mark is allowed based on the type of lane mark, an adjustment operation for correcting a course is not performed in a case where the departure from a lane by passing over the lane mark is allowed, and the adjustment operation for correcting a course is performed in a case where the departure from a lane by passing over the lane mark is not allowed. Here, particularly, when there is a risk that an object lateral to a lane along which a vehicle is traveling collides with the vehicle even in a case where the departure from a lane by passing over the lane mark is allowed, the adjustment operation for correcting a course is performed (see Japanese Patent No. 5350397 (JP 5350397 B)).

SUMMARY

In the technique disclosed in JP 5350397 B, it is not considered that other vehicles traveling along lanes adjacent to a lane along which a host vehicle is traveling thrust out to the lane along which the host vehicle is traveling.

The disclosure provides a lane keep assist device capable of performing lane keep assist in which a relative positional relationship between a host vehicle and other vehicles is considered.

An aspect of the disclosure relates to a lane keep assist device configured to perform lane keep assist control for making a host vehicle travel along a lane, and preventing the host vehicle from departing from the lane, the device including an electronic control device configured to: detect presence or absence of other vehicle, present in a vicinity of the host vehicle, which have a gradual decrease in a distance from the host vehicle; and when the another vehicle is detected, set virtual line extending along front-rear direction of the detected other vehicle at position away by first predetermined distance in right-left direction of the other vehicle from lateral side of the detected other vehicle, and specify the lane based on the set virtual line to perform the lane keep assist control.

In the lane keep assist control, the lane along which the host vehicle is traveling is specified. In a case where another vehicle is not present in the vicinity of the host vehicle, the lane may be specified by, for example, the roadside or the lane line. However, in a case where other vehicle is present in the vicinity of the host vehicle, an area in which the host vehicle can travel on a road is determined by a relationship between the host vehicle and other vehicle. Specifically, for example, even in a case where the host vehicle is traveling in an area between two lane lines on a road surface, other vehicle may come near the host vehicle side beyond the lane line in order to avoid obstacle. In this case, when the lane along which the host vehicle travels is specified based on the lane line, there is the possibility of the safety of the host vehicle being threatened.

According to the lane keep assist device, when another vehicle is detected, virtual line extending along the front-rear direction of the other vehicle is set at position away by the first predetermined distance from the lateral side of the other vehicle, and the lane is specified based on the set virtual line. Therefore, with the lane keep assist device, it is possible to perform lane keep assist in which a relative positional relationship between the host vehicle and other vehicle is considered.

Examples of "another vehicle having a gradual decrease in a distance from the host vehicle" may include an oncoming vehicle, a vehicle coming close to the host vehicle from the rear side of the host vehicle in its traveling direction, and a vehicle, present in front of the host vehicle in its traveling direction, which comes close to the host vehicle.

The "first predetermined distance" may be a value for setting the virtual line, and is set as a fixed value in advance or a variable value appropriate to some kind of physical quantity or parameters. Such a "first predetermined distance" may be set as, for example, a distance needed in order for the host vehicle and other vehicle to safely pass each other.

In the lane keep assist device according to the aspect, when a case where the other vehicle is detected, the electronic control device may be configured to specify the lane based on the set virtual lines to perform the lane keep assist control in a case where the set virtual line is closer to the host vehicle than to a lane line on a road along which the host vehicle is traveling. According to the aspect, it is possible to perform lane keep assist in which a relative positional relationship between the host vehicle and other vehicle is considered, while the lane along which the host vehicle travels is prevented from being specified to be wider than needed.

In the lane keep assist device according to the aspect, when traveling direction of the detected other vehicle and a traveling direction of the host vehicle are different from each other, the electronic control device may configured to set the first predetermined distance to be larger than the first predetermined distance in a case where the traveling direction of the detected other vehicle and the traveling direction of the host vehicle are the same as each other.

In a case where the traveling directions of the host vehicle and other vehicle are different from each other, a relative velocity between the host vehicle and the other vehicle becomes relatively high. On the other hand, in a case where the traveling directions of the host vehicle and the other vehicle are the same as each other, the relative velocity between the host vehicle and the other vehicle becomes relatively low. As described above, the first predetermined distance in a case where the traveling directions of the host vehicle and the other vehicle are different from each other may be set to be larger than the first predetermined distance in a case where the traveling directions of the host vehicle and the other vehicle are the same as each other, and thus the lane appropriate to the relative velocity between the host vehicle and the other vehicle can be specified based on the virtual line.

Meanwhile, the wording "the traveling direction of other vehicle and the traveling direction of a host vehicle are the same as each other" is not limited to a case where the traveling direction of the other vehicle and the traveling direction of the host vehicle are completely the same as each other (for example, straight lines extending along the front-rear directions of the other vehicle and a straight line extending along the front-rear direction of the host vehicle are parallel to each other). Even in a case where the traveling directions of the other vehicle and the traveling direction of the host vehicle deviate from each other more or less, the wording is a concept including, in practice, a case where the traveling direction of the other vehicle and the traveling direction of the host vehicle are regarded as being the same as each other.

In the lane keep assist device according to the aspect, the electronic control device may set the first predetermined distances to increase as a vehicle speed of the vehicle becomes higher.

In the lane keep assist device according to the aspect, in a case where the other vehicle is detected, the electronic control device may be configured to stop the lane keep assist control in a case where distance from a lateral side of the host vehicle to the set virtual line is less than a second predetermined distance in a right-left direction of the host vehicle.

The wording "distances from a lateral side of the host vehicle to the virtual line is less than a second predetermined distance" means that, for example, distance from the lateral side of the host vehicle to the lateral side of the other vehicle when the host vehicle and the other vehicle pass each other are excessively short. In a case where the distance from the lateral side of the host vehicle to the virtual line is excessively short, it is considered that a driver of the host vehicle can recognize that the other vehicle come near (or, come close to) the host vehicle side. In this case, safety is considered to be higher in a case where the host vehicle is controlled with the intention of a driver himself or herself than in a case where the lane keep assist is performed. Therefore, according to the aspect, the lane keep assist control is stopped, and thus it is possible to improve safety.

The "second predetermined distance" is a value for determining whether the lane keep assist control is stopped, and is set as a fixed value in advance or a variable value appropriate to some kind of physical quantity or parameters. Such a "second predetermined distance" may be set as, for example, a distance that makes it difficult to appropriately perform lane keep assist in a case where the lane is specified based on the virtual line, or a value obtained by adding a certain margin to the distance.

In the lane keep assist device according to the aspect, the electronic control device may be configured to determine whether the lane line is drawn on a road along which the host vehicle is traveling, in a case where the lane line is not drawn and the other vehicle is detected, to set the virtual line extending along the front-rear direction of the detected other vehicle at position away by the first predetermined distance in the right-left direction of the other vehicle from the lateral side of the detected other vehicle, and to specify the lane based on the set virtual line to perform the lane keep assist control.

In the lane keep assist device according to the aspect, the electronic control device may be configured to determine whether the lane line is drawn on a road along which the host vehicle is traveling, and to specify the lane based on a roadside, in a case where the lane line is not drawn and the other vehicle is not detect.

The operational effect and other advantages of an aspect of the disclosure will become more apparent from an embodiment described below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment relating to a lane keep assist device of the disclosure will be described with reference to FIGS. 1 to 5. In the following embodiment, a description will be given using a vehicle 1 having the lane keep assist device of the disclosure mounted therein.

Configuration of Vehicle

Figure 1:
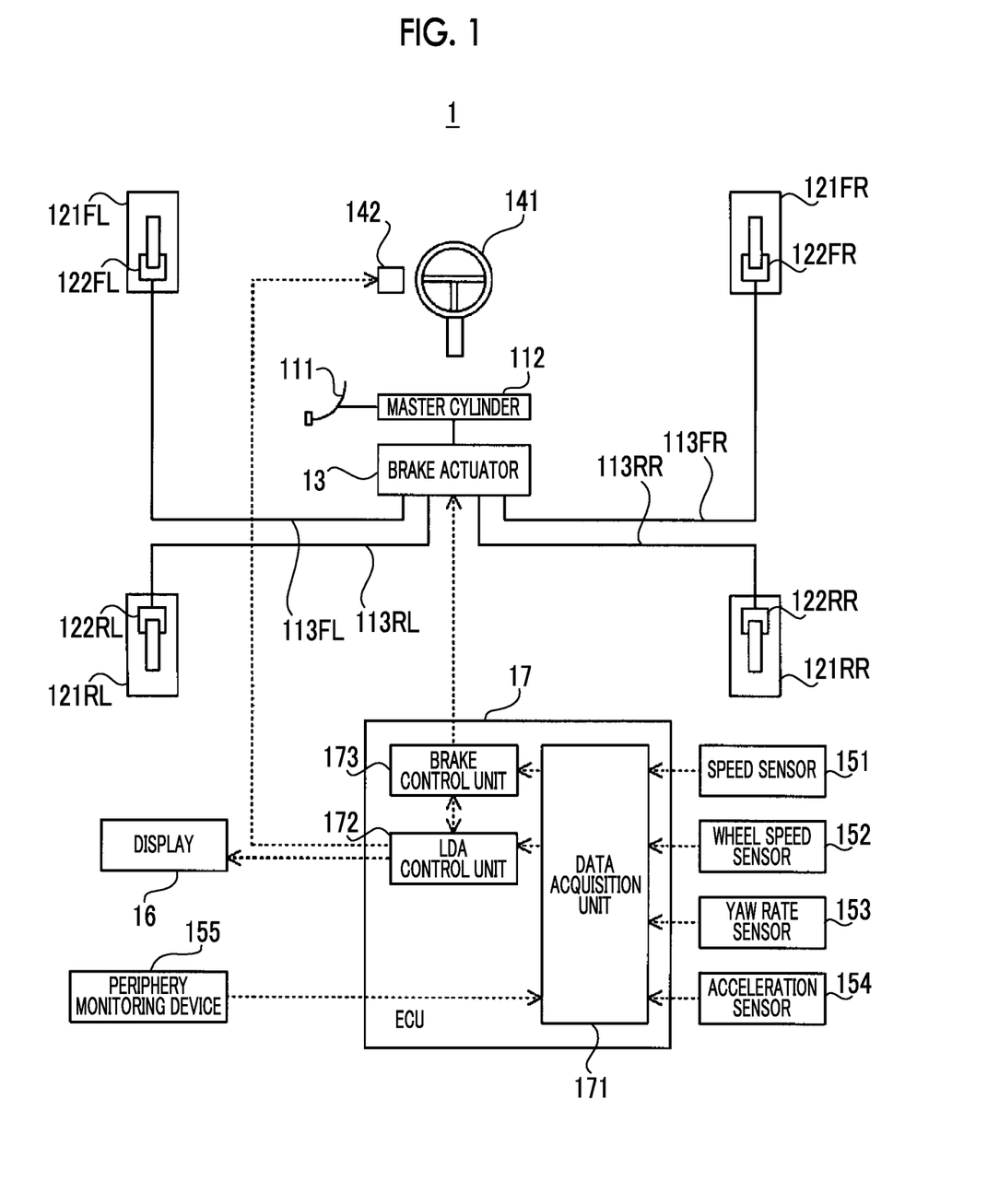
FIG. 1 is a block diagram illustrating a configuration of a vehicle according to an embodiment.

The configuration of the vehicle 1 will be described with reference to FIG. 1. FIG. 1 is a block diagram illustrating a configuration of a vehicle according to an embodiment.

In FIG. 1, the vehicle 1 includes a brake pedal 111, a master cylinder 112, a brake actuator 13, a wheel cylinder 122FL disposed at a left front wheel 121FL, a wheel cylinder 122FR disposed at a left rear wheel 121RL, a wheel cylinder 122RL disposed at a right front wheel 121FR, a wheel cylinder 122RR disposed at a right rear wheel 121RR, and brake pipes 113FL, 113RL, 113FR, 113RR.

The vehicle 1 further includes a steering wheel 141, a vibration actuator 142, a speed sensor 151, a wheel speed sensor 152, a yaw rate sensor 153, an acceleration sensor 154, a periphery monitoring device 155, a display 16, and an electronic control unit (ECU) 17 that is a specific example of the "lane keep assist device".

The master cylinder 112 adjusts the pressure of a brake fluid (or, any fluid) within the master cylinder 112, in accordance with the stepped amount of the brake pedal 111. The pressure of the brake fluid within the master cylinder 112 is transferred to the wheel cylinders 122FL, 122RL, 122FR, 122RR through the brake pipes 113FL, 113RL, 113FR, 113RR, respectively. As a result, braking forces appropriate to the pressure of the brake fluid transferred to the wheel cylinders 122FL, 122RL, 122FR, 122RR are applied to the left front wheel 121FL, the left rear wheel 121RL, the right front wheel 121FR and the right rear wheel 121RR, respectively.

The brake actuator 13 can adjust the pressure of the brake fluid transferred to each of the wheel cylinders 122FL, 122RL, 122FR, 122RR, independently of the stepped amount of the brake pedal 111, under the control of the ECU 17. Therefore, the brake actuator 13 can adjust braking force applied to each of the left front wheel 121FL, the left rear wheel 121RL, the right front wheel 121FR and the right rear wheel 121RR, independently of the stepped amount of the brake pedal 111.

The steering wheel 141 is an operator operated by a driver in order to steer the vehicle 1 (that is, steer a steering wheel). The vibration actuator 142 can vibrate the steering wheel 141 under the control of the ECU 17.

The ECU 17 controls the operation of the entire vehicle 1. Particularly in the present embodiment, the ECU 17 makes the vehicle 1 travel along a traveling lane on which the vehicle is currently traveling, and performs lane keep assist for suppressing the departure of the vehicle 1 from the traveling lane. That is, the ECU 17 functions as a control device for realizing lane keep assist including a lane keep operation (for example, lane keep assist (LKA)) and a lane departure suppression operation (for example, lane departure alert (LDA), lane departure prevention (LDP)).

The lane keep operation means that the ECU 17 controls electric power steering (EPS) (not shown) so that the vehicle 1 travels on, for example, the vicinity of the center of the traveling lane, or performs a call for attention through, for example, the display 16 in a case where the vehicle 1 has the possibility of departing from the traveling lane.

The lane departure suppression operation means that, in a case where the vehicle 1 has the possibility of departing from the traveling lane, the ECU 17 applies a yaw moment for returning the vehicle 1 to the center of the traveling lane to the vehicle 1 by controlling electric power steering (so-called EPS-LDA), or applies the yaw moment to the vehicle 1 by applying braking force to at least one of the left front wheel 121FL, the left rear wheel 121RL, the right front wheel 121FR and the right rear wheel 121RR (so-called brake LDA).

Various existing aspects can be applied to the lane keep operation and the lane departure suppression operation, and thus the description of the details thereof will not be given. However, an example of the lane departure suppression operation will be taken in order to describe the operation of the ECU 17 that is a specific example of the "lane keep assist device".

Lane Departure Suppression Operation

The lane departure suppression operation according to the present embodiment will be described with reference to the flowchart of FIG. 2. The lane departure suppression operation shown in FIG. 2 is equivalent to so-called brake LDA.

In order to perform the lane departure suppression operation, the ECU 17 includes a data acquisition unit 171, an LDA control unit 172, and a brake control unit 173, as processing blocks logically realized therein or processing circuits physically realized therein.

Figure 2:
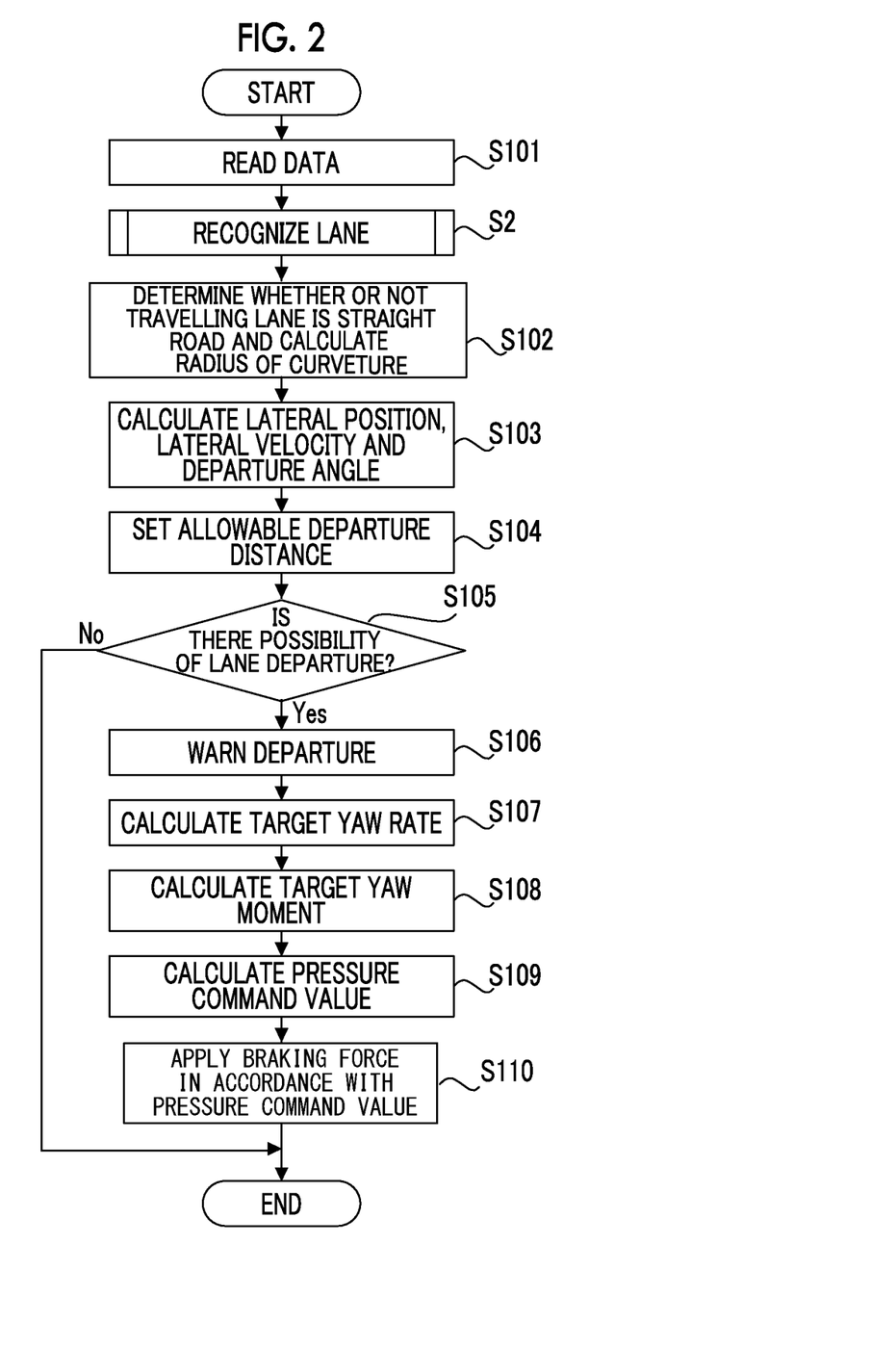
FIG. 2 is a flowchart illustrating a lane departure suppression operation according to the embodiment.

In FIG. 2, first, the data acquisition unit 171 acquires detection data indicating detection results of the speed sensor 151, the wheel speed sensor 152, the yaw rate sensor 153, the acceleration sensor 154 and the periphery monitoring device 155 (step S101). The periphery monitoring device 155 is configured to include, for example, a camera that captures an image of the vicinity of the vehicle 1, a millimeter-wave or infrared radar, and a light detection and ranging (LIDAR).

The LDA control unit 172 recognizes (step S2) a traveling lane on which the vehicle 1 is currently traveling based on the detection results or the like of the periphery monitoring device 155 acquired in the process of step S101, and the details of traveling lane recognition will be described later.

The LDA control unit 172 determines whether the traveling lane on which the vehicle 1 is currently traveling is a straight road or a curved road based on the result of the process of step S2, and calculates the radius of curvature of the traveling lane in a case where the traveling lane is determined to be a curved road (step S102).

The LDA control unit 172 further calculates the current lateral position, lateral velocity and departure angle of the vehicle 1, based on the result of the process of step S2 (step S103). The "lateral position" means a distance from the center of a traveling lane to the vehicle 1 (typically, distance to the center of the vehicle 1) along the direction of lane width orthogonal to a direction in which the traveling lane extends (lane extension direction). The "lateral velocity" means the velocity of the vehicle 1 along the direction of lane width. The "departure angle" means an angle between the traveling lane and the axis of the vehicle 1 in its front-rear direction (for example, an angle between the lane line and the axis of the vehicle 1 in its front-rear direction).

The LDA control unit 172 further sets an allowable departure distance (step S104). The allowable departure distance indicates an allowable maximum value of the departure distance of the vehicle 1 from the traveling lane (for example, departure distance of the vehicle 1 from the lane line) in a case where the vehicle 1 departs from the traveling lane. Therefore, the lane departure suppression operation is an operation for applying a yaw moment to the vehicle 1 so that the departure distance of the vehicle 1 from the traveling lane falls within the allowable departure distance.

Thereafter, the LDA control unit 172 determines whether the vehicle 1 has the possibility of lane departure (departing from the traveling lane on which the vehicle is currently traveling) (step S105). Specifically, for example, the LDA control unit 172 calculates the future (for example, after a few seconds to several tens of seconds) position of the vehicle 1, based on the current velocity, lateral position, lateral velocity and the like of the vehicle 1. The LDA control unit 172 determines whether the vehicle 1 straddles or treads the lane line at the future position. In a case where the LDA control unit determines that the vehicle 1 straddles or treads the lane line at the future position, the LDA control unit 172 determines that the vehicle 1 has the possibility of departing from the traveling lane.

In the determination of step S105, in a case where the LDA control unit determines that the vehicle 1 does not have the possibility of departing from the traveling lane (step S105: No), the lane departure suppression operation shown in FIG. 2 is terminated. Thereafter, the LDA control unit 172 starts the lane departure suppression operation shown in FIG. 2 again after a first predetermined period (for example, a few milliseconds to several tens of seconds) has elapsed. That is, the lane departure suppression operation shown in FIG. 2 is repeatedly performed with a period appropriate to the first predetermined period.

On the other hand, in the determination of step S105, in a case where the LDA control unit determines that the vehicle 1 has the possibility of departing from the traveling lane (step S105: Yes), the LDA control unit 172 turns on a control flag relating to the brake LDA. In addition, a driver of the vehicle 1 is warned that the vehicle 1 has the possibility of departing from the traveling lane, for example, through the display 16, or by applying a vibration to the steering wheel 141 using the vibration actuator 142 (step S106).

In a case where the LDA control unit determines that the vehicle 1 has the possibility of departing from the traveling lane, the LDA control unit 172 further calculates a new traveling locus along which the vehicle 1 traveling away from the center of the traveling lane travels toward the center of the traveling lane. In this case, the calculated traveling locus satisfies the restriction of the allowable departure distance that is set in the process of step S104.

Subsequently, the LDA control unit 172 calculates a yaw rate to be generated in the vehicle 1 in order to make the vehicle 1 travel along the new traveling locus, as a target yaw rate (step S107). Next, the LDA control unit 172 calculates a yaw moment to be applied to the vehicle 1 in order to generate the target yaw rate in the vehicle 1, as a target yaw moment (step S108). The LDA control unit 172 further calculates braking force that makes it possible to apply the target yaw moment to the vehicle 1. In this case, the LDA control unit 172 individually calculates braking forces that are applied to the left front wheel 121FL, the left rear wheel 121RL, the right front wheel 121FR and the right rear wheel 121RR.

Thereafter, the brake control unit 173 calculates a pressure command value for specifying the pressure of a brake fluid needed for generating the braking force calculated by the LDA control unit 172 (step S109). In this case, the brake control unit 174 individually calculates pressure command values for specifying the pressure of the brake fluid inside the wheel cylinders 122FL, 122RL, 122FR, 122RR.

Thereafter, the brake control unit 173 controls the brake actuator 13 based on the pressure command value calculated in the process of step S109. As a result, braking force appropriate to the pressure command value is applied to at least one of the left front wheel 121FL, the left rear wheel 121RL, the right front wheel 121FR and the right rear wheel 121RR (step S110).

Thereafter, the LDA control unit 172 starts the lane departure suppression operation shown in FIG. 2 again after the first predetermined period has elapsed. Here, since a control flag relating to the brake LDA is in an on-state, the lane departure suppression operation is started in a state where a yaw moment is applied to the vehicle 1.

In this case, in the determination of step S105 performed again, in a case where the LDA control unit determines that the vehicle 1 has the possibility of departing from the traveling lane (step S105: Yes), processes of step S106 and the subsequent steps are performed, and thus the application of the yaw moment to the vehicle 1 is continued. On the other hand, in the determination of step S105 performed again, in a case where the LDA control unit determines that the vehicle 1 does not have the possibility of departing from the traveling lane (step S105: No), the control flag relating to the brake LDA is turned off, and the application of the yaw moment to the vehicle 1 is terminated (that is, the lane departure suppression operation shown in FIG. 2 is terminated).

Traveling Lane Recognition Process

Next, a traveling lane recognition process according to the present embodiment will be described with reference to the flowchart of FIG. 3.

Figure 3:
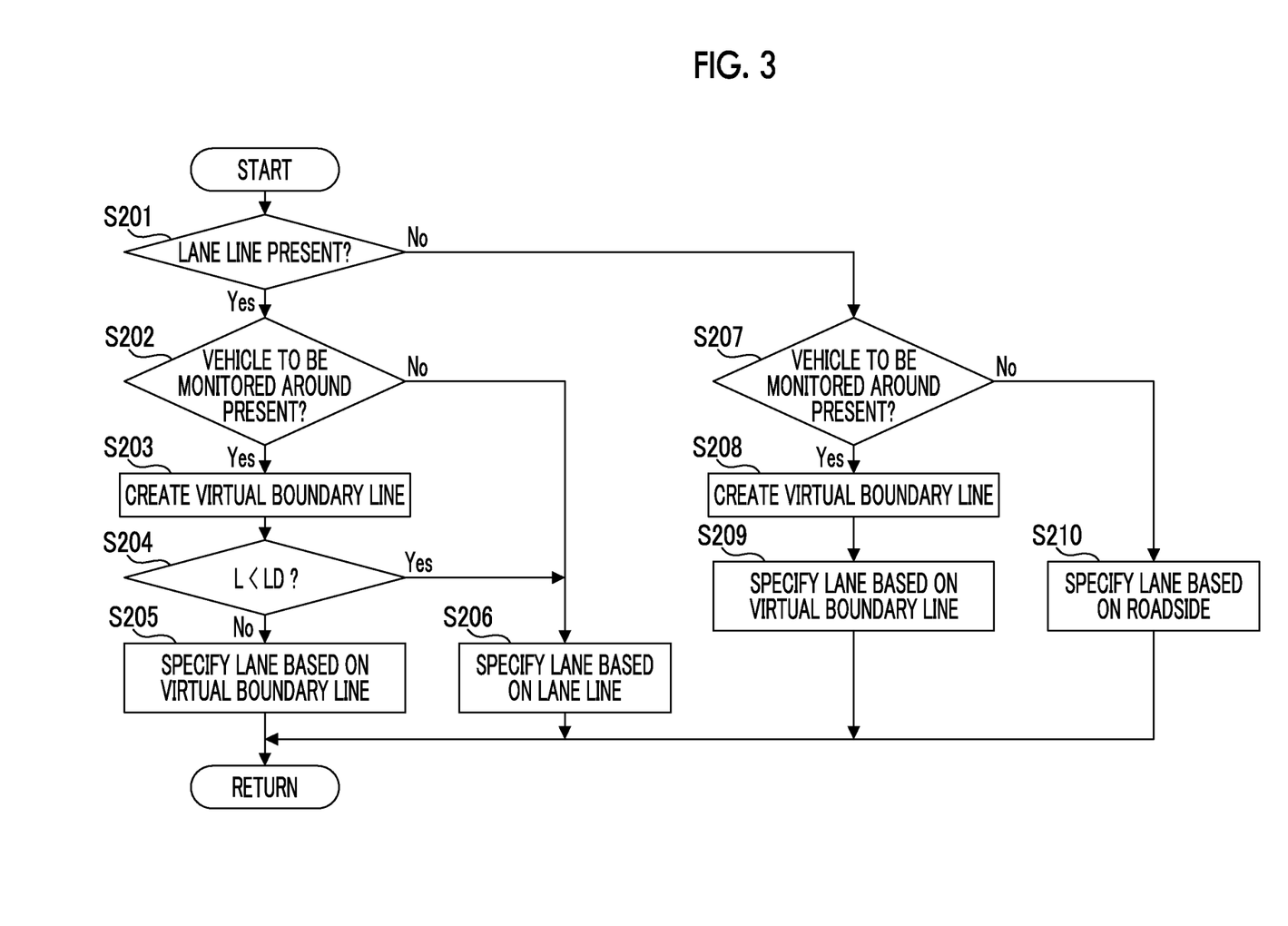
FIG. 3 is a flowchart illustrating a lane recognition process according to the embodiment.

In FIG. 3, first, the LDA control unit 172 determines whether a lane line is drawn on the road surface of a road on which the vehicle 1 is traveling, based on the detection results of the periphery monitoring device 155 acquired in the process of step S101 (step S201).

In the determination of step S201, in a case where the LDA control unit determines that the lane line is drawn (that is, in a case where the lane line is detected) (step S201: Yes), the LDA control unit 172 determines whether vehicle to be monitored are present in the vicinity of the vehicle 1, based on the detection results of the periphery monitoring device 155 acquired in the process of step S101 (step S202).

Figure 4:
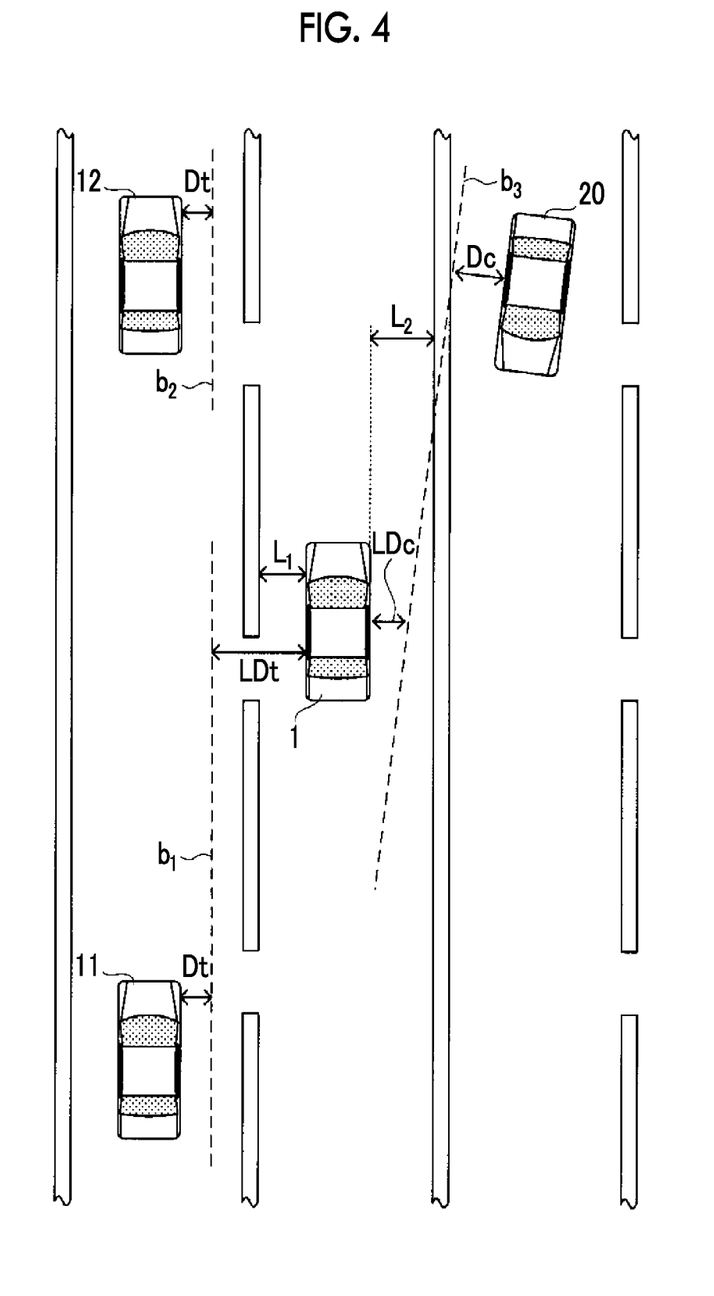
FIG. 4 is a plan view illustrating an example of a virtual boundary line according to the embodiment.

The "vehicle to be monitored" mean a vehicle (for example, vehicle 11 in FIG. 4) coming close to the vehicle 1 from the rear side of the vehicle 1 in its traveling direction, a vehicle (for example, vehicle 12 in FIG. 4), present in front of the vehicle 1 in its traveling direction, to which the vehicle 1 comes close, and an oncoming vehicle (for example, vehicle 20 in FIG. 4). Meanwhile, the "vehicle to be monitored" according to the present embodiment are an example of "another vehicle".

In the determination of step S202, in a case where the LDA control unit determines that no vehicle to be monitored is present (step S202: No), the LDA control unit 172 specifies the traveling lane of the vehicle 1 based on the lane line (step S206).

On the other hand, in the determination of step S202, in a case where the LDA control unit determines that the vehicle to be monitored is present (step S202: Yes), the LDA control unit 172 creates (or set) a virtual boundary line (step S203).

The virtual boundary line will be described with reference to FIG. 4. FIG. 4 is a plan view illustrating an example of a virtual boundary line according to the embodiment.

In a case where the vehicle to be monitored is the vehicle 11 in FIG. 4 (that is, vehicle coming close to the vehicle 1 from the rear side of the vehicle 1 in its traveling direction), the LDA control unit 172 sets a line $b_1$ extending along the front-rear direction of the vehicle 11, as the virtual boundary line, at a position away by a distance Dt in the right-left direction of the vehicle 11 from the lateral side of the vehicle 11 on the vehicle 1 side.

In a case where the vehicle to be monitored is the vehicle 12 in FIG. 4 (that is, vehicle, present in front of the vehicle 1 in its traveling direction, to which the vehicle 1 comes close), the LDA control unit 172 sets a line $b_2$ extending along the front-rear direction of the vehicle 12, as the virtual boundary line, at a position away by a distance Dt in the right-left direction of the vehicle 12 from the lateral side of the vehicle 12 on the vehicle 1 side.

In a case where the vehicle to be monitored is the vehicle 20 in FIG. 4 (that is, oncoming vehicle), the LDA control unit 172 sets a line $b_3$ extending along the front-rear direction of the vehicle 20, as the virtual boundary line, at a position away by a distance Dc in the right-left direction of the vehicle 20 from the lateral side of the vehicle 20 on the vehicle 1 side.

Figure 5:
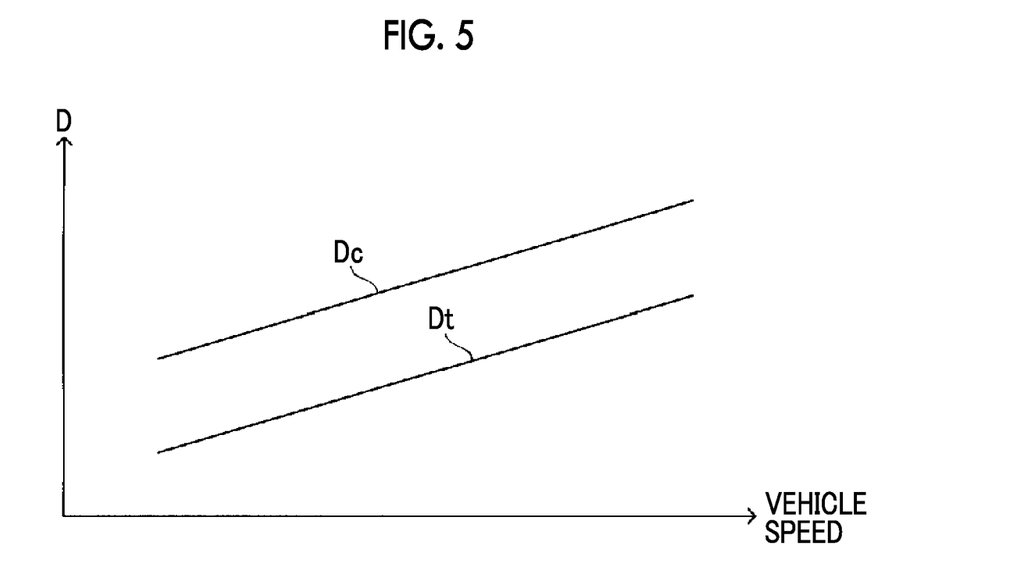
FIG. 5 is a diagram illustrating an example of a relationship between a vehicle speed and a distance from the lateral side of a vehicle to be monitored to a virtual boundary line.

As shown in FIG. 5, the distance Dt and the distance Dc monotonically increase the vehicle speed of the vehicle 1 becomes higher. As shown in FIG. 5, the distance Dc is larger than the distance Dt in a case of comparison at the same vehicle speed. This is because a relative velocity between the vehicle 1 and the vehicle 20 that is traveling in a direction opposite to the traveling direction of the vehicle 1 is larger than a relative velocity between the vehicle 1 and the vehicle 11 or the vehicle 12 that is traveling in the same direction as the traveling direction of the vehicle 1. Meanwhile, the "distance Dt and distance Dc" according to the present embodiment are an example of a "first predetermined distance".

Referring back to FIG. 3, after the process of step S203, the LDA control unit 172 determines whether a distance L (for example, $L_1$, $L_2$ in FIG. 4) from the lateral side of the vehicle 1 on the virtual boundary line side to the lane line is shorter than a distance LD (for example, LDt, LDc in FIG. 4) from the lateral side of the vehicle 1 on the virtual boundary line side to the virtual boundary line (step S204).

In the determination of step S204, in a case where the LDA control unit determines that the distance L is shorter than the distance LD (step S204: Yes), the LDA control unit 172 specifies the traveling lane of the vehicle 1 based on the lane line (step S206), and performs the processes of step S102 and the subsequent steps.

On the other hand, in the determination of step S204, in a case where the LDA control unit determines that the distance L is not shorter than the distance LD (step S204: No), the LDA control unit 172 specifies the traveling lane of the vehicle 1 based on the virtual boundary line (step S205), and performs the processes of step S102 and the subsequent steps.

For example, in a case where the virtual boundary line is the line $b_1$ in FIG. 4, the distance $L_1$ from the lateral side of the vehicle 1 on the line $b_1$ side to the lane line is shorter than the distance LDt from the lateral side of the vehicle 1 on the line $b_1$ side to the line $b_1$, and thus the LDA control unit 172 specifies the left lane edge of the vehicle 1 in its traveling direction, based on the lane line.

On the other hand, in a case where the virtual boundary line is the line $b_3$ in FIG. 4, the distance $L_2$ from the lateral side of the vehicle 1 on the line $b_3$ side to the lane line is longer than the distance LDc from the lateral side of the vehicle 1 on the line $b_3$ side to the line $b_3$, and thus the LDA control unit 172 specifies the right lane edge of the vehicle 1 in its traveling direction, based on the line $b_3$ as the virtual boundary line.

In the determination of step S201, in a case where the LDA control unit determines that the lane line is not drawn (that is, in a case where the lane line is not detected) (step S201: No), the LDA control unit 172 determines whether a vehicle to be monitored is present in the vicinity of the vehicle 1, based on the detection results of the periphery monitoring device 155 acquired in the process of step S101 (step S207).

In the determination of step S207, in a case where the LDA control unit determines that no vehicle to be monitored is present (step S207: No), the LDA control unit 172 specifies the traveling lane of the vehicle 1 based on a roadside demarcated by, for example, a curbstone, a guardrail, a wall or a fence (step S210), and performs the processes of step S102 and the subsequent steps.

On the other hand, in the determination of step S207, in a case where the LDA control unit determines that the vehicle to be monitored is present (step S207: Yes), the LDA control unit 172 creates (or set) a virtual boundary line (step S208). Subsequently, the LDA control unit 172 specifies the traveling lane of the vehicle 1 based on the virtual boundary line (step S209), and performs the processes of step S102 and the subsequent steps.

Meanwhile, in a case where a plurality of vehicles to be monitored is present, the traveling lane recognition process shown in FIG. 3 is performed on each of the vehicles to be monitored.

Technical Effect

In the lane keep assist including the above-described lane departure suppression operation, the traveling lane of the vehicle 1 needs to be specified. For example, in a case where the traveling lane of the vehicle 1 is constantly specified based on the lane line drawn on a road surface, and a vehicle having the possibility of coming close to the vehicle 1 beyond the lane line like, for example, the vehicle 20 in FIG. 4 is present, there is the possibility of making it difficult to cope with such a case through the lane keep assist.

In the present embodiment, in a case where a vehicle to be monitored is present in the vicinity of the vehicle 1, the virtual boundary line extending the front-rear direction of the vehicle to be monitored is set at a position away by the distance Dt or the distance Dc from the lateral side of the vehicle to be monitored. In a case where the lane line is drawn on a road surface, the traveling lane of the vehicle 1 is specified based on the virtual boundary line, on a condition that the distance from the lateral side of the vehicle 1 to the virtual boundary line is shorter than the distance from the lateral side of the vehicle 1 to the lane line. On the other hand, in a case where the lane line is not drawn on a road surface, the traveling lane of the vehicle 1 is specified based on the virtual boundary line.

Therefore, according to the present embodiment, even in a case where a vehicle having the possibility of coming close to the vehicle 1 beyond the lane line is present, it is possible to cope with such a case through the lane keep assist. That is, according to the present embodiment, it is possible to perform lane keep assist in which a relative positional relationship between the vehicle 1 and a vehicle to be monitored is considered. Additionally, in a case where the lane line is drawn on a road surface, the distance from the lateral side of the vehicle 1 to the virtual boundary line and the distance from the lateral side of the vehicle 1 to the lane line are compared with each other and then the traveling lane is specified. Therefore, it is possible to prevent the traveling lane from being specified to be wider than needs.

The "LDA control unit 172" according to the present embodiment is an example of "detection means". The "LDA control unit 172" and the "brake control unit 173" according to the present embodiment are an example of an "electronic control device".

Modification Example

Figure 6:
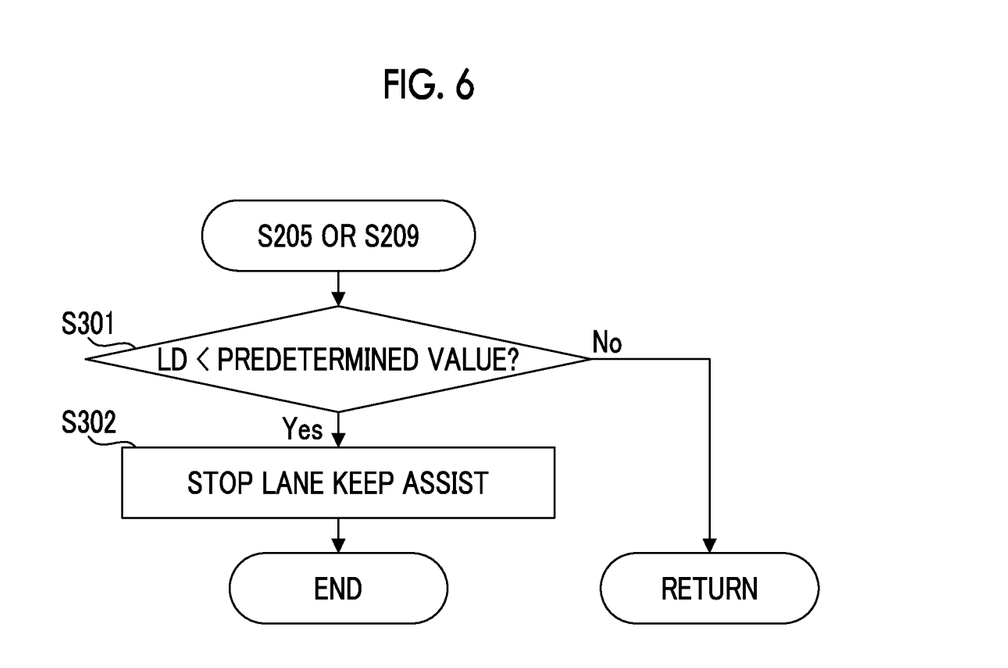
FIG. 6 is a flowchart illustrating a lane recognition process according to a modification example of the embodiment.

A modification example of the traveling lane recognition process according to the above-described embodiment will be described with reference to the flowchart of FIG. 6.

In the process of step S205 or S209, after the traveling lane of the vehicle 1 is specified based on the virtual boundary line, the LDA control unit 172 determines whether the distance LD (for example, LDt, LDc in FIG. 4) from the lateral side of the vehicle 1 on the virtual boundary line side to the virtual boundary line is less than a predetermined value in the right-left direction of the vehicle 1 (step S301). The "predetermined value" is an example of a "second predetermined distance", and is set to, for example, 10 cm (centimeter), 0 cm or the like.

The wording "the distance LD is less than a predetermined value" means that in a state where the vehicle 1 maintains a safe distance with a vehicle to be monitored, both the vehicles have difficulty in passing each other. Particularly, a case where the distance LD has a negative value refers to a case where the vehicle 1 straddles or treads the virtual boundary line, and means that there is the possibility of the vehicle 1 colliding with or coming into contact with the vehicle to be monitored.

In the determination of step S301, in a case where the LDA control unit determines that the distance LD is less than the predetermined value (step S301: Yes), the LDA control unit 172 stops the lane keep assist such as, for example, the lane departure suppression operation shown in FIG. 2 (step S302). This is because, in this case, safety is considered to be higher in a case where the vehicle 1 is controlled with the intention of a driver himself or herself than in a case where the lane keep assist is performed (that is, than in a case where the vehicle 1 is automatically controlled).

On the other hand, in the determination of step S301, in a case where the LDA control unit determines that the distance LD is not less than the predetermined value (step S301: No), the LDA control unit 172 performs the processes of step S102 and the subsequent steps (see FIG. 2).

The aspect of the disclosure is not limited to the above-described embodiment, and may be appropriately modified without departing from the scope of the disclosure that can be read from claims and the entire specification. In addition, a lane keep assist device involving such modifications is also intended to be included in the technical scope of the disclosure.

What is claimed is:

1. A lane keep assist device configured to perform lane keep assist control for making a host vehicle travel along a lane, and preventing the host vehicle from departing from the lane, the lane keep assist device comprising an electronic control device configured to detect an other vehicle, present in a vicinity of the host vehicle, which has a gradual decrease in a distance from the host vehicle, and when the other vehicle is detected, set a virtual line extending along a front-rear direction of the detected other vehicle, based on the front-rear direction of the detected other vehicle, at a position away from a lateral side of the detected other vehicle by a first predetermined distance in a right-left direction of the detected other vehicle, and perform the lane keep assist control for making the host vehicle travel along the set virtual line, and prevent the host vehicle from departing from the set virtual line, wherein the set virtual line changes according to a change in the front-rear direction of the detected other vehicle, wherein when the other vehicle is detected, the electronic control device is configured to perform the lane keep assist control for making the host vehicle travel along the set virtual line based upon the electronic control device determining that the set virtual line is closer to the host vehicle than to a lane line on a road along which the host vehicle is traveling.

2. The lane keep assist device according to claim 1, wherein, when a traveling direction of the detected other vehicle and a traveling direction of the host vehicle are different from each other, the electronic control device is configured to set the first predetermined distance to be larger than when the traveling direction of the detected other vehicle and the traveling direction of the host vehicle are the same as each other.

3. The lane keep assist device according to claim 1, wherein the electronic control device sets the first predetermined distance to increase as a vehicle speed of the host vehicle becomes higher.

4. The lane keep assist device according to claim 1, wherein when the electronic control device detects the other vehicle, the electronic control device is configured to stop the lane keep assist control when a distance from a lateral side of the host vehicle to the set virtual line is less than a second predetermined distance in a right-left direction of the host vehicle.

5. The lane keep assist device according to claim 1, wherein the electronic control device is configured to determine whether the lane line is drawn on a road along which the host vehicle is traveling, when the lane line is not drawn and the other vehicle is detected, to set the virtual line extending along the front-rear direction of the detected other vehicle at the position away from the lateral sides of the detected other vehicle by the first predetermined distance in the right-left direction of the other vehicle, and to perform the lane keep assist control for making the host vehicle travel along the set virtual line, and prevent the host vehicle from departing from the set virtual line.

6. The lane keep assist device according to claim 1, wherein the electronic control device is configured to determine whether the lane line is drawn on a road along which the host vehicle is traveling, and to specify the lane based on a roadside, when the lane line is not drawn and the other vehicle is not detected.

* * * * *